United States Patent Office 3,527,758
Patented Sept. 8, 1970

1

3,527,758
PROCESS FOR THE PREPARATION OF PYRAZINOYLGUANIDINES FROM A PYRAZINOIC AZIDE AND A GUANIDINE
Edward J. Cragoe, Jr., Lansdale, and James H. Jones, Blue Bell, Pa., assignors to Merck & Co., Inc., a corporation of New Jersey
No Drawing. Filed Apr. 13, 1967, Ser. No. 630,521
Int. Cl. C07d 51/76
U.S. Cl. 260—250                        17 Claims

ABSTRACT OF THE DISCLOSURE

A process is described wherein 3-amino-pyrazinoic acid azides are reacted with guanidines to form 3-aminopyrazinoylguanidines. The pyrazinoic acid azides of this invention are reactive carbonyl derivatives that permit preparation of pyrazinoylguanidines under mild conditions with a minimum of side reactions. The products of this process have activity as diuretics, and are useful in the treatment of disorders conducive to diuretic and/or saluretic therapy.

---

This invention is concerned with a process for the preparation of pyrazinoylguanidines. In particular it is concerned with 3-aminopyrazinoic acid azides and the preparation of 3-aminopyrazinoylguanidines therefrom by a process which comprises the reaction of a novel pyrazinoic acid azide with a guanidine. The process can be represented by the following equation:

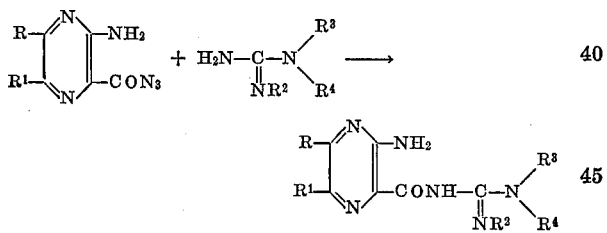

wherein R represents:

(a) hydrogen,
(b) hydroxy,
(c) alkyl, preferably lower alkyl of from 1 to about 6 carbon atoms, either straight or branched chain, such as methyl, ethyl, propyl, butyl, pentyl, hexyl, and their branched chained isomers, particularly methyl or ethyl,
(d) mononuclear aryl, especially phenyl, either unsubstituted or substituted, especially with halo, such as chloro or bromo,
(e) mercapto,
(f) lower alkylthio of from 1 to about 5 carbon atoms, particularly methyl, ethyl, or propylthio,
(g) phenyl-lower alkylthio wherein the alkyl moiety has from 1 to 3 carbons, such as benzylthio or phenethylthio or the like, (h) 

wherein $R^5$ represents:

(1) hydrogen,
(2) alkyl, preferably lower alkyl of from 1 to about 6 carbon atoms such as methyl, ethyl, propyl, butyl, pentyl or hexyl, either straight or branched chain, particularly methyl or ethyl,
(3) lower alkenyl of from 2 to about 5 carbon atoms, particularly allyl, or propenyl, and $R^6$ represents:

(1) hydrogen,
(2) lower alkenyl of from 2 to about 5 carbon atoms, particularly allyl or propenyl,
(3) lower cycloalkyl, having from 3 to about 8 carbon atoms, particularly cyclopropyl, cyclopentyl or cyclohexyl,
(4) mononuclear aryl, especially phenyl, either unsubstituted or substituted with for example lower alkyl having from 1 to 3 carbons or halo, especially chloro, bromo and fluoro,
(5) alkyl, preferably lower alkyl of from 1 to 6 carbon atoms such as methyl, ethyl, propyl, butyl, pentyl or hexyl, either straight or branched chain, and either unsubstituted or substituted with, for example,
  (a) hydroxy,
  (b) di(lower alkyl)amino wherein each lower alkyl group has from 1 to about 4 carbon atoms, particularly methyl, or ethyl,
  (c) lower cycloalkyl having from 3 to about 8 nuclear carbon atoms, particularly cyclopropyl, cyclopentyl or cyclohexyl,
  (d) mononuclear aryl, especially phenyl, either unsubstituted or substituted with, for example, lower alkyl having from 1 to 3 carbons, or halo, especially chloro, bromo or fluoro,
  (e) ω,ω,ω-trifluoro,
  (f) heterocyclic such as picolyl, furfuryl, or the like, (g) lower alkoxy of from 1 to about 4 carbon atoms, particularly methoxy or ethoxy, when $R^5$ and $R^6$ represent lower alkyl they can be linked together to form, with the nitrogen atom to which they are attached, a heterocyclic group, e.g., pyrrolidinyl, piperidino or the like;

$R^1$ represents:
(a) halo, such as chloro or bromo,
(b) lower alkyl of from 1 to about 6 carbon atoms such as methyl, ethyl, propyl, butyl, pentyl or hexyl, either straight chain,
(c) mononuclear aryl, especially phenyl, either unsubstituted or substituted with for example halo, especially chloro or bromo;

$R^2$ and $R^3$ can be similar or dissimilar, and each represents:

(a) hydrogen,
(b) lower alkyl of from 1 to about 6 carbon atoms particularly methyl, ethyl, or propyl, or
(c) when both represent lower alkyl groups they can be linked together to form a cyclic structure with the nitrogens to which they are attached, particularly a 2-imidazolinyl or 3,4,5,6 - tetrahydro - 2 - pyrimidinyl group;

$R^4$ represents:

(a) hydrogen,
(b) lower alkyl of from 1 to about 6 carbon atoms, particularly methyl, ethyl, or propyl,
(c) substituted lower alkyl with substituents such as:
 (1) aryl, such as naphthyl or phenyl,
 (2) substituted mononuclear aryl, such as with halogen, particularly chloro or fluoro, lower alkyl or lower alkoxy each having from 1 to about 3 carbon atoms,
 (3) heterocyclic substituents such as octahydro-1-azocinyl, hexahydro-1-azepinyl or pyridyl,
 (4) hydroxyl,
(d) mononuclear aryl, especially phenyl, either unsubstituted or substituted with, for example:
 (1) lower alkyl of from 1 to about 3 carbons, such as methyl, ethyl or propyl,
 (2) lower alkoxy of from 1 to about 3 carbon atoms such as methoxy, ethoxy or propoxy,
 (3) halo, particularly chloro or fluoro;
when $R^3$ and $R^4$ represent lower alkyl groups they may be linked either directly or through a hetero atom especially an O or N atom to produce a 5 to 8 membered ring, thus forming with the nitrogen atom to which they are attached rings such as 1-pyrrolidinyl, piperidino, morpholino or the like.

Prior to this invention the only satisfactory method of preparing pyrazinoylguanidines involved the reaction of pyrazinoic acid esters or related compounds such as pyrazinoxazinones with a guanidine. It was, however, found that certain substituted guanidines would not react with these compounds at all or only very slowly. A search was therefore made for a more reactive type of pyrazinoyl compound and it was found that the pyrazinoic acid azides were readily prepared and were indeed much more reactive than the esters previously employed. The azides have the advantage of reacting rapidly with the guanidines including those that were previously found to be unreactive toward the ester or pyrazinoxazinone compounds and in the majority of cases to give, by virtue of the rapid rate of reaction, a better yield and purer product.

The process of this invention as shown by the equation

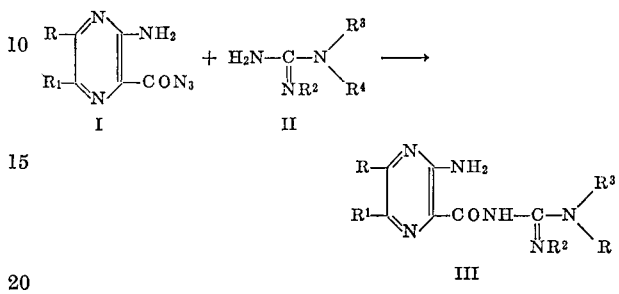

involves the treatment of a 3-amino-5-R-6-$R^1$-pyrazinoic acid azide with a 2-$R^2$-3-$R^3$-3-$R^4$-guanidine to produce a 1 - (3-amino - 5-R-6-$R^1$ - pyrazinoyl) - 2-$R^2$-3-$R^3$-3-$R^4$-guanidine. The pyrazinoic acid azide is usually added to an anhydrous solution of the guanidine, as the free base, in a hydroxylic solvent such as straight or branched chain or cyclic $C_{1-6}$ alkanol such as methanol, ethanol, propanol, butanol, pentanol, hexanol, cyclopentanol, cyclohexanol, and the like or 2-alkoxyethanol or related solvents, preferably 2-propanol. The mixture then is heated at from steam bath temperature to about reflux temperature, conveniently the latter, for a few minutes to 5 to 6 hours, 30 minutes usually being sufficient. The end product, III, can then be isolated by known, conventional procedures such as by quenching the reaction mixture with an excess of ice water, usually about 2 volumes and collecting the precipitated solid by filtration or other convenient means and then drying. The solid then can be redissolved in water by the addition of a few drops of a mineral acid, the solution filtered and made acid with a slight excess of mineral acid, usually hydrochloric acid, and the precipitated product isolated by filtration and dried.

The pyrazinoic acid azide starting materials are not only useful as starting materials but some of them have useful biological properties as well. These compounds are obtained from the corresponding pyrazinoic acid hydrazides by diazotization with an alkali metal nitrite in strong acid medium. The alkali metal nitrite, usually sodium nitrite in water is added slowly, preferably below the surface, to a stirred solution of the hydrazide in dilute mineral acid, usually about 0.5 N hydrochloric acid, although concentrations of up to about 1 N sulfuric, hydrobromic or other mineral acids can be employed, at a temperature from ambient to about steam bath temperature. The temperature employed is usually that required to dissolve the hydrazide. The acid azide precipitates from the reaction mixture. The azides can be purified and characterized if desired. However, they are in general unstable and tend to explode on heating. As a rule therefore they are dried carefully and used directly in the novel reaction of this invention without purification or characterization.

The pyrazinoic acid hydrazide starting materials are readily prepared by known methods and are described in Examples 1–36.

The pyrazinoylguanidine compounds prepared by the process of this invention are useful as they possess diuretic and natriuretic properties. They differ from most of the known, effective diuretic agents; however, in that these compounds selectively enhance the excretion of sodium ions without causing an increase in potassium ion excretion. The potassium loss, which is caused by known diuretics, often results in a severe muscular weakness. Since the compounds prepared by the process of this invention are essentially free of this potassium depletion activity, they have this decided advantage as diuretics. As diuretic agents, they can be used for the treatment of edema, hypertension and other diseases known to be responsive to this therapy. It has also been found as another feature of this invention that when co-administered with other diuretic agents known to enhance the elimination of potassium ions along with sodium ions, the novel pyrazinoylguanidines of this invention will reduce the excretion of potassium ions and thus overcome this undesirable property of other diuretic agents. The compounds prepared by the process of this invention, therefore, are useful in combination with other classes of diuretic agents to prevent the loss of potassium which the other diuretics otherwise would cause to be eliminated.

PREPARATION OF PYRAZINOIC ACID HYDRAZIDES

Example 1.—3-amino-5-diethylamino-6-chloropyrazinoic acid hydrazide

Hydrazine (20 ml. of 64% aqueous solution) is added to a solution of methyl 3-amino-5-diethylamino-6-chloropyrazinoate (10.0 g., 0.04 mole) in ethanol (250 ml.) and the reaction mixture is refluxed for 4 hours. The solvent is then removed in vacuo and the residue is washed out with water and dried to yield 9.0 g. (87%) of 3-amino-5-diethylamino-6-chloropyrazinoic acid hydrazide, melting at 137–140° C. After crystallization from 2-propanol the product melts at 142–145° C.

Analysis.—Calculated for $C_9H_{15}ClN_6O$ (percent): C, 41.79; H, 5.84; N, 32.49. Found (percent): C, 42.00; H, 6.05; N, 32.10.

By employing substantially the same method described in Example 1, but substituting for methyl 3-amino-5-diethylamino-6-chloropyrazinoate used therein, equimolar quantities of the methyl 3-amino-5-R-6-$R^1$-pyrazinoates depicted in Table I, under starting materials, there are produced according to equation I, the corresponding 3-amino-5-R-6-$R^1$-pyrazinoic acid hydrazides, also shown in Table I under the heading "Products."

TABLE I

I. 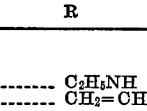 + $NH_2NH_2$ ⟶ 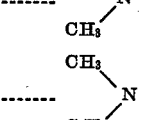

| Starting Material | | | | Product | | | | | |
|---|---|---|---|---|---|---|---|---|---|
| | | | | | | Analysis | | | |
| | | | | | | Calculated | | Found | |
| R | $R^1$ | M.P., °C. | Formula | C | H | N | C | H | N |

Example:

| | R | $R^1$ | M.P., °C. | Formula | C | H | N | C | H | N |
|---|---|---|---|---|---|---|---|---|---|---|
| 2 | $C_2H_5NH$— | Cl | 168–70 | $C_7H_{11}ClN_6O$ | 36.45 | 4.80 | 36.44 | 36.71 | 4.87 | 36.71 |
| 3 | $CH_2=CHCH_2NH$— | Cl | 158–60 | $C_8H_{11}ClN_6O$ | 39.59 | 4.57 | 34.63 | 39.66 | 4.77 | 34.65 |
| 4 | 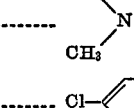 | $CH_3$ | | $C_8H_{14}N_6O$ | | | | | | |
| 5 | 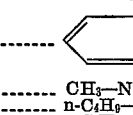 | Cl | 134–6 | $C_8H_{13}ClN_6O$ | 39.27 | 5.36 | 34.35 | 39.36 | 5.51 | 34.39 |
| 6 | 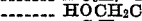 | Cl | 132–4 | $C_8H_{13}ClN_6O$ | 39.27 | 5.36 | 34.35 | 39.00 | 5.50 | 34.35 |
| 7 | 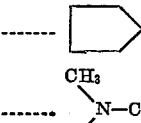 | Cl | 158–60 | $C_{12}H_{12}Cl_2N_6O$ | 44.05 | 3.70 | 25.69 | 43.86 | 3.75 | 25.61 |
| 8 | 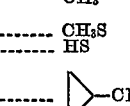 | $CH_3$ | | $C_{12}H_{13}N_5O$ | | | | | | |
| 9 | $CH_3$—NH— | Cl | 257–60 | $C_6H_9ClN_6O$ | Compound not purified | | | | | |
| 10 | n-$C_4H_9$—NH— | Cl | 162–5 | $C_9H_{15}ClN_6O$ | 41.78 | 5.84 | 32.49 | 42.10 | 6.0 | 32.6 |
| 11 | n-$C_3H_7$—NH— | Cl | 171.3 | $C_8H_{13}ClN_6O$ | 39.27 | 5.35 | 35.35 | 39.33 | 5.38 | 35.46 |
| 12 | $HOCH_2CH_2NH$— | Cl | 184–5 | $C_7H_{11}ClN_6O_2$ | 34.08 | 4.50 | 34.07 | 34.31 | 4.59 | 34.38 |
| 13 | n-$C_6H_{13}$— | Cl | | $C_{11}H_{18}ClN_5O$ | | | | | | |
| 14 | 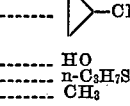 | Cl | 143–5 | $C_{10}H_{15}ClN_6O$ | 44.36 | 5.58 | 31.05 | 44.52 | 5.71 | 30.85 |
| 15 | $(CH_3)_2N$—$CH_2CH_2NH$— | Cl | 161–3 | $C_9H_{16}ClN_7O$ | 39.49 | 5.89 | 35.82 | 39.86 | 5.94 | 36.04 |
| 16 | $CH_3S$— | Cl | 240–2 | $C_6H_8ClN_5OS$ | 30.84 | 3.45 | 29.27 | 31.11 | 3.45 | 29.92 |
| 17 | HS— | Cl | 218–20 | $C_5H_6ClN_5OS$ | Compound not purified | | | | | |
| 18 | cyclopropyl-$CH_2NH$— | Cl | | $C_9H_{13}ClN_5O$ | | | | | | |
| 19 | HO— | Cl | >300 | $C_5H_6ClN_5O_2$ | 29.49 | 2.97 | 34.40 | 29.58 | 3.16 | 34.17 |
| 20 | n-$C_3H_7S$— | Cl | 166–8 | $C_8H_{11}ClN_5OS$ | 36.71 | 4.62 | 26.76 | 37.08 | 4.44 | 27.15 |
| 21 | $CH_3$ | Br | 202–5 | $C_6H_8BrN_5O$ | 29.28 | 3.28 | 28.46 | 29.20 | 3.09 | 28.60 |

TABLE I—Continued

| | Starting Material | | Product | | | | | | | |
|---|---|---|---|---|---|---|---|---|---|---|
| | | | | | | Analysis | | | | |
| | | | | | | Calculated | | | Found | | |
| Example: | R | R[1] | M.P., °C. | Formula | C | H | N | C | H | N |
| 22 | (cyclopropyl)-NH— | Cl | | $C_8H_{11}ClN_6O$ | | | | | | |
| 23 | $CH_3$-C$_6$H$_4$-$CH_2NH$— | Cl | | $C_{13}H_{15}ClN_6O$ | | | | | | |
| 24 | Cl-C$_6$H$_4$-NH— | Cl | | $C_{11}H_{10}ClN_6O$ | | | | | | |
| 25 | C$_6$H$_5$-$CH_2CH_2NH$— | Cl | | $C_{13}H_{15}ClN_6O$ | | | | | | |
| 26 | (CH$_3$)$_2$N— | C$_6$H$_5$— | 153-4 | $C_{13}H_{16}N_6O$ | 57.34 | 5.92 | 30.86 | 57.77 | 5.81 | 30.71 |
| 27 | $CF_3CH_2NH$— | Cl | | $C_7H_8ClFN_6O$ | | | | | | |
| 28 | (pyridyl)-$CH_2NH$— | Cl | | $C_{11}H_{12}ClN_7O$ | | | | | | |
| 29 | (furyl)-$CH_2NH$— | Cl | | $C_{10}H_{11}ClN_6O_2$ | | | | | | |
| 30 | $C_2H_5S$— | Cl | 196-9 | $C_7H_{10}ClN_5OS$ | 33.94 | 4.07 | 28.27 | 34.13 | 3.68 | 28.68 |
| 31 | $nC_5H_{11}S$— | Cl | 265-7 (HCl) | $C_{10}H_{16}ClN_5OS \cdot HCl$ | 36.81 | 5.25 | 21.47 | 37.01 | 5.00 | 21.63 |
| 32 | (CH$_3$)(CH$_2$=CH—CH$_2$)N— | Cl | | $C_9H_{13}ClN_6O$ | | | | | | |
| 33 | (pyrrolidinyl) | Cl | | $C_{10}H_{15}ClN_6O$ | | | | | | |
| 34 | (CH$_3$)(n-C$_3$H$_7$)N— | Cl | | $C_9H_{15}ClN_6O$ | 133-6 | 41.78 | 5.84 | 32.49 | 41.92 | 5.84 | 32.31 |
| 35 | C$_6$H$_5$-$CH_2$-S— | Cl | | $C_{12}H_{12}ClN_5OS$ | | | | | | |
| 36 | H | Br | | $C_5H_6BrN_5O$ | | | | | | |

PREPARATION OF PYRAZINOYLGUANIDINES

Example 37.—(3,5-diamino - 6 - chloropyrazinoyl)guanidine hydrochloride

Step A: Preparation of 3,5-diamino-6-chloropyrazinoic acid azide.—To a stirred solution of 3,5-diamino-6-chloropyrazinoic acid hydrazide (10.0 g., 0.05 mole) in 0.5 N hydrochloric acid (350 ml.), maintained at 50–55° C., is added a solution of sodium nitrite (3.45 g., 0.05 mole) in water (20 ml.) over a period of 45 minutes. The solid that separates is recovered by filtration, washed well with water and dried to yield 6.4 g. (60%) of 3,5-diamino-6-chloropyrazinoic acid azide, melting at 160° C. (explodes). The product is purified by dissolving in acetone and precipitating by the addition of water; however, the melting point remains unchanged.

Analysis.—Calculated for $C_5H_4ClN_7O$ (percent): C, 28.11; H, 1.89; N, 45.90. Found (percent): C, 28.35; H, 2.26; N, 45.71.

Step B: Preparation of (3,5-diamino-6-chloropyrazinoyl)guanidine hydrochloride.—To a stirred solution of sodium (0.46 g., 0.02 g. atom) in 2-propanol (50 ml.) is added guanidine hydrochloride (2.0 g., 0.002 mole) and the mixture is refluxed for 30 minutes then cooled and filtered to remove the precipitated sodium chloride. To the filtrate is added 3,5-diamino-6-chloropyrazinoic acid azide (1.07 g., 0.005 mole) and the mixture is refluxed for 30 minutes, poured into ice water (100 ml.) and the precipitated solid is recovered by filtration and dried. The solid is dissolved in water (50 ml.) by the addition of a few drops of hydrochloric acid and the solution is filtered. To the filtrate is added 6 N hydrochloric acid (10 ml.) and the solid that separates is recovered by filtration and dried to yield 0.4 g. (31%) of (3,5-diamino-6-chloropyrazinoyl)guanidine hydrochloride dihydrate, melting at 285–288° C. After careful purification the M.P. is 295° C.

Analysis.—Calculated for $C_6H_8ClN_7O \cdot HCl \cdot 2H_2O$ (percent): C, 23.85; H, 4.00; N, 32.45. Found (percent): C, 23.93; H, 4.40; N, 32.27.

The melting point of the free base is 240.5–241.5° C., and that of the hydrochloride salt is 293.5° C.

Employing the method described in Example 37 but substituting for 3,5-diamino-6-chloropyrazinoic acid hydrazide used in Step A equimolar amounts of the 3-amino-5-R-6-R[1]-pyrazinoic acid hydrazides described in Table II, there are produced according to Equation II, the corresponding 3-amino-5-R-6-R[1]-pyrazinoic acid azides which in most cases are not characterized. Then by employing the process of Step B, but substituting these acid azides for the 3,5-diamino-6-chloropyrazinoic acid azide and equimolar amounts of 2-R[2]-3-R[3]-3-R[4]-guanidine identified in the table for the guanidine therein there are produced the 1-(3-amino-5-R-6-R[1]-pyrazinoyl)-2-R[2]-3-R[3]-3-R[4]-guanidines, also described in Table II.

3,527,758

TABLE II

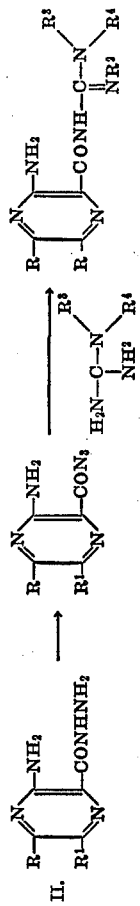

| Example No. | Starting material found in Example | R | R¹ | R² | R³ | R⁴ | M.P. of azide, °C. | M.P. of product, °C. | Empirical formula |
|---|---|---|---|---|---|---|---|---|---|
| 38 | 1 | (C₂H₅)₂N— | Cl | H | H | H |  | 215 | C₁₀H₁₆ClN₇O |
| 39 | 2 | C₆H₅NH— | Cl | H | H | H |  | 217–18 | C₈H₁₂ClN₇O |
| 40 | 3 | CH₂=CHCH₂NH— | Cl | H | H | H |  | 213–14 | C₉H₁₂ClN₇O |
| 41 | 4 | (CH₃)₂N— | CH₃ | H | H | H |  | 262 | C₉H₁₆N₇O·2HCl |
| 42 | 5 | CH₃—N(C₂H₅)— | Cl | H | H | H |  | 229–30 | C₉H₁₄ClN₇O |
| 43 | 6 | CH₃—CH(NH—)—C₂H₅ | Cl | H | H | H |  | 215 | C₉H₁₄ClN₇O |
| 44 | 7 | Cl—C₆H₄—CH₂NH— | Cl | H | H | H |  | 225–6 | C₁₃H₁₃Cl₂N₇O |
| 45 | 8 | C₆H₅— | CH₃ | H | H | H |  |  |  |
| 46 | 9 | CH₃NH— | Cl | H | H | H |  | 288–9 | C₇H₁₀ClN₇O |
| 47 | 10 | n-C₃H₇NH— | Cl | H | H | H |  | 219.5 | C₁₀H₁₆ClN₇O |
| 48 | 11 | n-C₅H₁₁NH— | Cl | H | H | H |  | 221–2 | C₉H₁₂ClN₇O |
| 49 | 12 | HO(CH₂)₂NH— | Cl | H | H | H | 153 | 272–3 | C₈H₁₂ClN₇O₂·HCl |
| 50 | 13 | n-C₆H₁₃— | Cl | H | H | H |  |  |  |
| 51 | 14 | (CH₃)₂CH—NH— | Cl | H | H | H |  | 219–20 | C₁₁H₁₆ClN₇O |
| 52 | 15 | (CH₃)₂N(CH₂)₂NH— | Cl | H | H | H |  | 192.5–4.5 | C₁₀H₁₇ClN₈O |
| 53 | 16 | CH₃S— | Cl | H | H | H |  | 234.5–6.5 | C₆H₆ClN₆OS |
| 54 | 17 | HS— | Cl | H | H | H |  | 236.5 | C₆H₇ClN₆OS |
| 55 | 18 | cyclopropyl-CH₂NH— | Cl | H | H | H |  | 220–1.5 | C₁₀H₁₄ClN₇O |
| 56 | 19 | HO— | Cl | H | H | H |  | >310 | C₆H₆N₇O₂·HCl |
| 57 | 20 | n-C₃H₇S— | Cl | H | H | H |  |  |  |
| 58 | 21 | CH₃ | Br | H | H | H | 143 | 288 | C₆H₆BrN₆O·HCl |
| 59 | 22 | cyclopropyl-NH— | Cl | H | H | H |  | 213–15 | C₉H₁₂ClN₇O |
| 60 | 23 | CH₃—C₆H₄—CH₂NH— | Cl | H | H | H |  | 216–17 | C₁₄H₁₆ClN₇O |

TABLE II—Continued

| Starting material found in Example | R | R¹ | R² | R³ | R⁴ | M.P. of azide, °C. | M.P. of product, °C. | Empirical formula |
|---|---|---|---|---|---|---|---|---|
| 61 | 4-Cl-C₆H₄-NH- | Cl | H | H | H | | 276-8 | C₁₂H₁₁Cl₂N₇O |
| 62 | C₆H₅-(CH₂)₂NH- | Cl | H | H | H | | 199-202 | C₁₄H₁₆ClN₇O·HCl |
| 63 | (CH₃)₂N-C₆H₄- | | H | H | H | 92-3 | 205-6 | C₁₄H₁₇N₇O |
| 64 | CF₃CH₂NH- | Cl | H | H | H | | 232-3 | C₈H₉ClF₃N₇O |
| 65 | 4-pyridyl-CH₂NH- | Cl | H | H | H | | 239-40 | C₁₂H₁₃ClN₈O |
| 66 | furfuryl-CH₂NH- | Cl | H | H | H | | 217-18 | C₁₁H₁₂ClN₇O₂ |
| 67 | C₂H₅S- | Cl | H | H | H | 151 | | |
| 68 | n-C₅H₁₁S- | Cl | H | H | H | 132-3 | | |
| 69 | (CH₃)₂N-N=CH- | Cl | H | H | H | | 207-8 | C₁₀H₁₄ClN₇O |
| 70 | CH₂=CH-CH₂- pyrrolidinyl | Cl | H | H | H | | 244.5-5.5 | C₁₀H₁₄ClN₇O |
| 71 | (CH₃)₂N-n-C₃H₇- | Cl | H | H | H | 102-6 | 214-15 | C₁₀H₁₅ClN₇O |
| 72 | (CH₃)₂N- | Cl | H | H | H | 155 | 216-17 | C₈H₁₂ClN₇O |
| 73 | H | Cl | H | H | H | 140 | 228.5-9.5 | C₆H₆ClN₇O₂·HCl |
| 74 | CH₃O(CH₂)₂NH- | Cl | H | H | H | | 272 | C₁₂H₁₂ClN₇O·CH₃SO₃H |
| 75 | H | 4-CH₃-C₆H₄- | H | H | H | 158 | | |
| 76 | NH₂ | 4-CH₃-C₆H₄- | H | H | HOCH₂CH₂-C₆H₄- | | | |
| 77 | NH₂ | Cl | H | H | CH₃-C₆H₄-CH₂- | | 215-16 | C₁₃H₁₄ClN₇O |
| 78 | NH₂ | Cl | H | H | 4-F-C₆H₄-CH₂- | | 216-19.5 | |
| 79 | NH₂ | Cl | H | H | | | | |

TABLE II—Continued

| Example | Starting material found in Example | R | R¹ | R² | R³ | R⁴ | M.P. of azide, °C. | M.P. of product, °C. | Empirical formula |
|---|---|---|---|---|---|---|---|---|---|
| 80 | 37-A | NH₂ | Cl | H | H | (phenyl-CH(CH₃)-) | | 153-70 | |
| 81 | 37-A | NH₂ | Cl | H | H | (naphthyl-CH₂-) | | 243.5-5.5 | |
| 82 | 37-A | NH₂ | Cl | H | H | (pyridyl-CH₂-) | | 280.5-3.5 | |
| 83 | 37-A | NH₂ | Cl | H | H | (4-CH₃-phenyl-CH₂-) | | 210-12 | C₁₄H₁₆ClN₇O |
| 84 | 37-A | NH₂ | Cl | H | CH₃ | (phenyl-CH₂-) | | 274.5 | C₁₄H₁₆ClN₇O·HCl |
| 85 | 37-A | NH₂ | Cl | H | H | (2-Cl-phenyl-CH₂-) | | 220-3 | C₁₃H₁₃Cl₂N₇O |
| 86 | 37-A | NH₂ | Cl | H | H | (4-Cl-phenyl-CH₂-) | | 204-6 | C₁₃H₁₃Cl₂N₇O |
| 87 | 37-A | NH₂ | Cl | H | H | (4-CH₃O-phenyl-CH₂-) | | 175.5-9.5 | C₁₄H₁₆ClN₇O₂ |
| 88 | 37-A | NH₂ | Cl | H | H | (2-CH₃,4-Cl-phenyl-CH₂-) | | 220-2 | C₁₄H₁₆ClN₇O |
| 89 | 37-A | NH₂ | Cl | H | H | (2-Cl,4-Cl-phenyl-CH₂-) | | 267.5-70.5 | C₁₃H₁₂Cl₃N₇O·HCl |
| 90 | 36 | H | Br | H | H | H | 135 | | |
| 91 | 37-A | NH₂ | Cl | H | H | (3-Cl,4-Cl-phenyl-CH₂-) | | 216-19 | C₁₃H₁₂Cl₃N₇O |
| 92 | 37-A | NH₂ | Cl | H | H | (phenyl-CH₂CH₂-) | | 219-21.5 | C₁₄H₁₆ClN₇O |

TABLE II—Continued

| Starting material found in Example | R | R1 | R3 | R4 | M.P. of azide, °C. | M.P. of product, °C. | Empirical formula |
|---|---|---|---|---|---|---|---|
| 93 | NH₂ | Cl | CH₃— | CH₃— | | 275 | C₉H₁₃ClN₇O·HCl·2H₂O |
| 94 | NH₂ | Cl | C₂H₅— | C₂H₅— | | 265 | C₁₀H₁₆ClN₇O |
| 95 | NH₂ | Cl | n-C₄H₉— | n-C₄H₉— | | 148-9 | C₁₄H₂₄ClN₇O |
| 96 | NH₂ | Cl | —(CH₂)₄— | | | | |
| 97 | NH₂ | Cl | —(CH₂)₂—O—(CH₂)₂— | | | | |
| 98 | CH₃—CH—NH₂ | Cl | CH₃— | H | | | |
| | CH₃ | | | | | | |
| 99 | | Cl | CH₃ | CH₃ | | 238.5-40.5 | C₁₁H₁₆ClN₇O |
| 100 | CH₂=CH—CH₂— | Cl | CH₃ | CH₃ | | 213-15 | C₁₁H₁₆ClN₇O |
| 101 | n-C₄H₉—NH— | Cl | CH₃ | CH₃ | | 187.5 | C₁₂H₂₀ClN₇O |
| 102 | CH₂—NH₂ | Cl | CH₃ | CH₃ | | 196-7 | C₁₂H₁₃ClN₇O |
| 103 | (CH₃)₂N— | Cl | CH₃ | CH₃ | | 219 | C₁₀H₁₆ClN₇O |
| 104 | CH₃—N⁺—C₂H₅ | Cl | CH₃ | CH₃ | | 217-18 | C₁₁H₁₉ClN₇O |
| 105 | (C₂H₅)₂N— | Cl | —(CH₂)₂— | CH₃ | | | |
| 106 | NH₂ | Cl | —(CH₂)₃— | H | | 212-14 | C₁₂H₂₀ClN₇O |
| 107 | NH₂ | Cl | | H | | | |
| 108 | CH₂S—⟨phenyl⟩ | Cl | H | H | | | |

What is claimed is:

1. A process for the preparation of a member selected from the group consisting of a pyrazinoylguanidine of structural formula

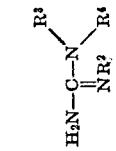

with guanidine of structural formula

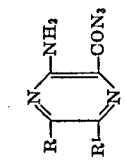

in an anhydrous hydroxylic solvent and with heating from about steam bath temperature to reflux temperature of reaction mixture wherein R is a member selected from the group consisting of:
(a) hydrogen,
(b) hydroxy,
(c) lower alkyl,
(d) phenyl and halo-phenyl,
(e) mercapto,
(f) lower alkylthio,
(g) phenyl-lower alkylthio, (h) 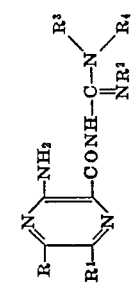

wherein R⁵ is a member selected from the group consisting of:
(1) hydrogen,
(2) lower alkyl,
(3) lower alkenyl, and
R⁶ is a member selected from the group consisting of:
(1) hydrogen,
(2) lower alkenyl,
(3) C₃₋₈ cycloalkyl,
(4) phenyl,
(5) lower alkyl-phenyl,
(6) halo-phenyl, and pharmaceutically acceptable, non toxic acid addition salts, which comprises the reaction of a pyrazinoic acid azide of structural formula (7) lower alkyl,
(8) hydroxy-lower alkyl,
(9) di(lower alkyl)amino-lower alkyl,
(10) $C_{3-8}$ cycloalkyl-lower alkyl,
(11) phenyl-lower alkyl,
(12) lower alkyl-phenyl-lower alkyl,
(13) $\omega,\omega,\omega$-trifluoro-lower alkyl,
(14) pyridyl-lower alkyl,
(15) furyl-lower alkyl, and
(16) lower alkoxy-lower alkyl;

$R^5$ and $R^6$ when lower alkyl can be linke dtogether to form with the nitrogen atom to which they are attached, a heterocyclic group;

$R^1$ is a member selected from the group consisting of:
(a) halogen,
(b) lower alkyl,
(c) phenyl, and
(d) halo-phenyl;

$R^2$ and $R^3$ are similar or dissimilar and each is a member selected from the group consisting of:
(a) hydrogen,
(b) lower alkyl,
(c) when both represent lower alkyl they can be linked together to form a cyclic structure with the nitrogen atoms to which they are attached;

$R^4$ is a member selected from the group consisting of:
(a) hydrogen,
(b) lower alkyl,
(c) phenyl-lower alkyl,
(d) naphthyl-lower alkyl,
(e) halo-phenyl-lower alkyl,
(f) lower alkyl-phenyl-lower alkyl,
(g) lower alkoxy-phenyl-lower alkyl,
(h) octahydro-1-azocinyl-lower alkyl,
(i) octahydro-1-azepinyl-lower alkyl,
(j) pyridyl-lower alkyl,
(k) hydroxy-lower alkyl,
(l) phenyl,
(m) lower alkyl-phenyl,
(n) lower alkoxy-phenyl, and
(o) halo-phenyl;

$R^3$ and $R^4$ when lower alkyl can be linked directly together to form with the nitrogen atom to which they are attached a member selected from the group consisting of 5-8 membered rings; and $R^3$ and $R^4$ when lower alkyl can be linked together through a hetero atom selected from O and N to form with the nitrogen atom to which they are attached a member selected from the group consisting of 5-8 membered rings.

2. The process as claimed in claim 1, wherein $R^2$, $R^3$ and $R^4$ are each hydrogen.

3. The process as claimed in claim 1, wherein $R^2$ and $R^3$ are each hydrogen, and $R^4$ is hydroxyethyl.

4. The process as claimed in claim 1, wherein R is amino and $R^1$ is chloro.

5. The process as claimed in claim 1, wherein R is hydrogen and $R^1$ is chloro.

6. The process as claimed in claim 1, wherein A is dimethylamino and $R^1$ is chloro.

7. The process as claimed in claim 1, wherein R, $R^2$, $R^3$ and $R^4$ each is hydrogen, and $R^1$ is bromo, thus yielding (3-amino-6-bromopyrazinoyl)guanidine.

8. The process as claimed in claim 1, wherein R, $R^2$, $R^3$ and $R^4$ each is hydrogen and $R^1$ is chloro, thus yielding (3-amino-6-chloropyrazinoyl)guanidine.

9. The process as claimed in claim 1, wherein R is amino, $R^1$ is chloro and $R^2$, $R^3$ and $R^4$ is hydrogen, thus yielding (3,5-diamino-6-chloropyrazinoyl)guanidine.

10. The process as claimed in claim 1, wherein R is dimethylamino, $R^1$ is chloro, $R^2$, $R^3$ and $R^4$ each is hydrogen, thus yielding (3-amino-5-dimethylamino-6-chloropyrazinoyl)guanidine.

11. A process for the preparation of 3-amino-5 and/or 6-substituted pyracinoic acid azides which comprises diazotization of a 3-amino-5 and/or 6-substituted-pyrazinoic acid hydrazide with aqueous nitrous acid in dilute mineral acid at from about ambient to about steam bath temperature.

12. The process according to claim 11 wherein the pyrazinoic acid hydrazide and pyrazinoic acid azide are of Structure I and II respectively:

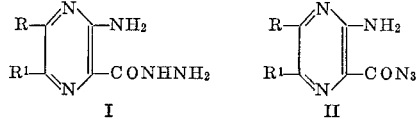

wherein R and $R^1$ each have the meanings assigned to them in claim 1.

13. A compound of structural formula

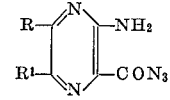

wherein R is a member selected from the group consisting of:
(a) hydrogen,
(b) hydroxy,
(c) lower alkyl,
(d) phenyl and halo-phenyl,
(e) mercapto,
(f) lower alkylthio,
(g) phenyl-lower alkylthio,
(h)

wherein $R^5$ is a member selected from the group consisting of:
(1) hydrogen,
(2) lower alkyl,
(3) lower alkenyl, and $R^6$ is a member selected from the group consisting of:
(1) hydrogen,
(2) lower alkenyl,
(3) $C_{3-8}$ cycloalkyl,
(4) phenyl,
(5) lower alkyl-phenyl,
(6) halo-phenyl,
(7) lower alkyl,
(8) hydroxy-lower alkyl,
(9) di(lower alkyl)amino-lower alkyl,
(10) $C_{3-8}$ cycloalkyl-lower alkyl,
(11) phenyl-lower alkyl,
(12) lower alkyl-phenyl-lower alkyl,
(13) $\omega,\omega,\omega$-trifluoro-lower alkyl,
(14) pyridyl-lower alkyl,
(15) furyl-lower alkyl, and
(16) lower alkoxy-lower alkyl;

$R^5$ and $R^6$ when lower alkyl can be linked together to form with the nitrogen atom to which they are attached, a heterocyclic group;

$R^1$ is a member selected from the group consisting of:
(a) halogen,
(b) lower alkyl,
(c) phenyl, and
(d) halo-phenyl.

14. 3-amino-6-chloropyrazinoic acid azide.
15. 3-amino-6-bromopyrazinoic acid azide.
16. 3-amino-5-dimethylamino-6-chloropyrazinoic acid azide.
17. 3,5-diamino-6-chloropyrazinoic acid azide.

No references cited.

NICHOLAS S. RIZZO, Primary Examiner

U.S. Cl. X.R.

260—247.2

UNITED STATES PATENT OFFICE
CERTIFICATE OF CORRECTION

Patent No. 3,527,758   Dated September 8, 1970

Inventor(s) Edward J. Cragoe, Jr. and James H. Jones

It is certified that error appears in the above-identified patent and that said Letters Patent are hereby corrected as shown below:

In column 6, Table I, Example 10, in the column headed "Analysis - Found" change "6.0" to read --6.01-- and change "32.6" to read --32.63--. In column 9, in the heading of Table II, correct the structure appearing under the second arrow to read as follows:

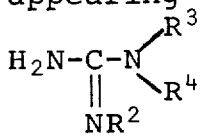

Column 10, Example 51, in the column headed "R" correct the structure to read as follows:

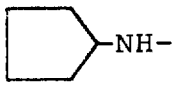

In column 12, Example 70, in the column headed "R" correct the structure to read as follows:

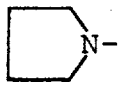

Column 12, Example 78, correct the empirical formula to read --$C_{13}H_{14}ClN_7O$--. In column 13, in the columnar headings, change "$R^1$" in the heading of the fifth column to read --$R^2$--; in Example 80, change the m.p. of product to read --153-60--; in Example 84, change the empirical formula to read --$C_{14}H_{16}ClN_7O \cdot HCl$--. In column 14, Example 91, change the empirical formula to read --$C_{13}H_{12}Cl_3N_7O$--; in Example 92, in the column headed "$R^4$", correct the structure to read

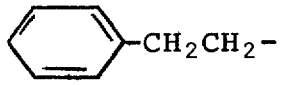

In column 15, in the columnar headings, change "R" in the heading of the fifth column to read --$R^2$--; in Example 104, in the column headed "R", delete the "+" sign from the structure; and in Example 104, change the empirical formula to read --$C_{11}H_{18}ClN_7O$--. In column 17, Claim 6, line 57, change "A" to read --R--.

SIGNED AND SEALED
JAN 5 1971

(SEAL)
Attest:

Edward M. Fletcher, Jr.
Attesting Officer

WILLIAM E. SCHUYLER, JR.
Commissioner of Patents